(12) United States Patent
Waelde et al.

(10) Patent No.: US 11,385,089 B2
(45) Date of Patent: Jul. 12, 2022

(54) BATTERY-OPERATED FIELD DEVICE WITH TIME TRANSMISSION

(71) Applicant: VEGA Grieshaber KG, Wolfach (DE)

(72) Inventors: Steffen Waelde, Niedereschach (DE); Joerg Boersig, Schapbach (DE)

(73) Assignee: VEGA Grieshaber KG, Wolfach (DE)

( * ) Notice: Subject to any disclaimer, the term of this patent is extended or adjusted under 35 U.S.C. 154(b) by 188 days.

(21) Appl. No.: 16/515,902

(22) Filed: Jul. 18, 2019

(65) Prior Publication Data
US 2020/0025600 A1   Jan. 23, 2020

(30) Foreign Application Priority Data
Jul. 20, 2018 (EP) .................................... 18184774

(51) Int. Cl.
*G01F 23/00* (2022.01)
*H05K 5/00* (2006.01)
(Continued)

(52) U.S. Cl.
CPC ........ *G01F 23/00* (2013.01); *H04W 52/0258* (2013.01); *H04W 52/0261* (2013.01);
(Continued)

(58) Field of Classification Search
CPC ...... G01F 23/00; G01F 1/00; H04W 52/0258; H04W 52/0261; H04W 52/386;
(Continued)

(56) References Cited

U.S. PATENT DOCUMENTS

| | | |
|---|---|---|
| 4,491,016 A | 1/1985 | Haefner |
| 6,438,462 B1 | 8/2002 | Hanf et al. |

(Continued)

FOREIGN PATENT DOCUMENTS

| | | |
|---|---|---|
| DE | 101 16 871 A1 | 11/2002 |
| DE | 196 11 942 A1 | 2/2003 |

(Continued)

OTHER PUBLICATIONS

IEEE: WE-Safe: A Self-Powered Wearable IoT Sensor Network for Safety Applications Based on LoRa; Fan Wu , (Student Member, IEEE), Jean-Michel Redouté , (Senior Member, IEEE), and Mehmet Rasit Yuce , (Senior Member, IEEE); Jun. 12, 2018 (Year: 2018).*

(Continued)

*Primary Examiner* — Hassan A Phillips
*Assistant Examiner* — Mohammed S Chowdhury
(74) *Attorney, Agent, or Firm* — Oblon, McClelland, Maier & Neustadt, L.L.P.

(57) ABSTRACT

Battery-operated field devices and methods for operating battery-operated field devices, in particular field devices for fill level measurement, for determining a limit level, for detecting a topology of a filling material surface, or for displaying the measured values of these devices, is provided. A battery-operated field device, which may be a fill level sensor device, a flow sensor device, a pressure sensor device, or a display device, includes an energy storage means, a time management unit connected to the energy storage means via a first line, and a radio unit connected to the energy storage means via a switch, the radio unit being configured to transmit time information about a next measurement via a first interface to the time management unit and/or to receive the time information from the radio unit, when the switch is activated.

12 Claims, 8 Drawing Sheets

(51) Int. Cl.
*H04W 52/02* (2009.01)
*H04W 52/38* (2009.01)
*H04L 67/10* (2022.01)

(52) U.S. Cl.
CPC ........ *H04W 52/386* (2013.01); *H05K 5/0017* (2013.01); *H04L 67/10* (2013.01)

(58) Field of Classification Search
CPC .................. H05K 5/0017; H04L 67/10; G05B 2219/15117; G05B 2219/25428; G05B 19/0426; G05B 19/4185; G05B 19/41845; G01D 4/004
See application file for complete search history.

(56) References Cited

U.S. PATENT DOCUMENTS

| | | | |
|---|---|---|---|
| 7,321,774 | B1 | 1/2008 | Lau et al. |
| 7,821,410 | B2 | 10/2010 | Higashionji et al. |
| 7,933,733 | B2 | 4/2011 | Ashrafzadeh et al. |
| 8,179,266 | B2 | 5/2012 | Hermle |
| 8,416,090 | B2 | 4/2013 | Bucciero |
| 8,733,664 | B2 | 5/2014 | Loeffler et al. |
| 9,886,660 | B2 | 2/2018 | Hammerschmidt et al. |
| 9,904,347 | B2 | 2/2018 | Allgaier et al. |
| 10,024,705 | B2 | 7/2018 | Kech |
| 2007/0236359 | A1* | 10/2007 | Wynans ................. G01D 4/004 340/664 |
| 2010/0106446 | A1 | 4/2010 | Ashrafzadeh et al. |
| 2010/0222895 | A1* | 9/2010 | Seiler ..................... H04L 12/12 700/16 |
| 2012/0132710 | A1* | 5/2012 | Loeffler ............. G06K 19/0723 235/439 |
| 2013/0069817 | A1 | 3/2013 | Wenger |
| 2013/0211870 | A1* | 8/2013 | Lawson ............. H04L 67/2804 705/7.25 |
| 2015/0113180 | A1 | 4/2015 | Baret et al. |
| 2016/0131686 | A1* | 5/2016 | Handley ........... H02J 13/00017 324/76.11 |
| 2017/0104515 | A1 | 4/2017 | Holweg et al. |
| 2017/0229904 | A1 | 8/2017 | Allgaier et al. |
| 2018/0031687 | A1 | 2/2018 | Mueller et al. |
| 2018/0183855 | A1* | 6/2018 | Sabella ................ H04L 47/803 |
| 2019/0281370 | A1* | 9/2019 | Struhsaker ............... A61B 5/00 |

FOREIGN PATENT DOCUMENTS

| | | |
|---|---|---|
| DE | 102006055897 B4 | 2/2009 |
| DE | 10 2009 019 657 A1 | 8/2011 |
| DE | 10 2012 112 687 A1 | 6/2014 |
| DE | 10 2015 117 170 A1 | 4/2017 |
| EP | 2 256 566 A1 | 12/2010 |
| EP | 2 667 162 A1 | 11/2013 |
| EP | 2 829 929 A1 | 1/2015 |
| EP | 3 035 010 A1 | 6/2016 |
| EP | 3 177 898 A1 | 6/2017 |
| EP | 3 279 619 A1 | 2/2018 |
| GB | 2 271 691 A | 4/1994 |
| JP | 2008-015855 A | 1/2008 |
| JP | 2010-257124 A | 11/2010 |
| KR | 10-1862143 B1 | 5/2018 |
| WO | WO 02/082248 A2 | 10/2002 |
| WO | WO 2012/114749 A1 | 8/2012 |
| WO | WO 2013/156945 A1 | 10/2013 |
| WO | WO-2013156945 A1 * | 10/2013 ........... G01F 15/063 |
| WO | WO 2014/083340 A1 | 6/2014 |
| WO | WO 2014/095256 A1 | 6/2014 |
| WO | WO 2016/116167 A1 | 7/2016 |

OTHER PUBLICATIONS

IEEE: Design of a smart grid for an isolated village supplied with renewable energies. M. Kesraoui & A. Chaib, 2013. (Year: 2013).*
IEEE: Monitoring in Industrial Systems Using Wireless Sensor Network With Dynamic Power Management; Fabiano Salvadori, Member, IEEE, Maurício de Campos, Student Member, IEEE, Paulo Sérgio Sausen, Robinson Figueiredo de Camargo, Camila Gehrke, Cassiano Rech, Member, IEEE, Marco Aurélio Spohn. (Year: 2009).*
Office Action issued 18 184 774.0 in corresponding European Patent Application No. 18 184 774.0, 7 pages.
Office Action dated Dec. 2, 2019 in corresponding European Patent Application No. 18 184 774.0, 7 pages.
Office Action dated Dec. 2, 2019 in corresponding European Patent Application No. 18 184 802.9, 7 pages.
European Office Action dated Nov. 18, 2020 in corresponding European Patent Appication No. 18 184 802.9, 6 pages.
Apr. 11, 2022 Office Action and Search Report issued in correspondence Russian Application No. 2020143349.

* cited by examiner

BATTERY-OPERATED FIELD DEVICE WITH TIME TRANSMISSION

CROSS-REFERENCE TO RELATED APPLICATIONS

This application claims the benefit of the filing date of European Patent Application No. 18 184 774.0, filed on 20 Jul. 2018, the entire content of which is incorporated herein by reference.

FIELD

The invention relates to battery-operated field devices and to a method for operating battery-operated field devices, in particular field devices for fill level measurement, for determining the limit level, for detecting the topology of a filling material surface, or for displaying the measured values of these devices. Examples of such devices are an impedance limit switch, a vibration limit switch, a fill level radar or a radar fill level gauge, or a display device, for example, with a low-energy display. Furthermore, the invention relates to a use, a program element, and a computer-readable medium.

BACKGROUND

Various types of sensor systems are used for a fill level measurement, e.g., in a container. Some of these sensor or display systems are designed as field devices, i.e., these devices are used independently of a power grid and therefore depend on a battery or the like. Some embodiments are encapsulated, for example, for reasons of corrosion protection, and so the replacement of the battery can be elaborate. It is therefore important to operate these field devices in an energy-saving manner, so that they can be operated as long as possible without maintenance and other interventions.

SUMMARY

The invention addresses the problem of providing a system architecture and a method, using battery-operated field devices which can be operated in the most energy-saving manner possible.

A battery-operated field device, in particular a fill level sensor device, a flow sensor device, a pressure sensor device, or a display device, comprises an energy storage means. Said energy storage means can be designed as a battery, as an accumulator (rechargeable battery), as a fuel cell, or as a corresponding device.

Furthermore, the field device has a time management unit, which is connected to the energy storage means via a first line. The time management unit controls at least some settings or methods that are used to obtain or transmit time information and/or to control by means of the time information. The time management unit is connected to the energy storage means via a first line, and so it is continuously supplied with power, i.e., at least as long as the energy storage means is functional.

Furthermore, the field device comprises a radio unit, which is connected to the energy storage means via a switch. The radio unit is suitable for sending and receiving information. The radio unit can only be operated when the switch is activated and the radio unit is connected to the energy storage means.

The radio unit is designed to transmit time information about the next measurement via a first interface to the time management unit and/or to receive said time information from the radio unit when the switch is activated.

Due to said system architecture of the field device, it is no longer necessary that the entire field device is activated continuously; instead, with the exception of the time management unit, parts of the field device, in particular all parts of the field device, can be deactivated, when no measurement takes place. In the case of a display device, parts of the field device can be deactivated, when no display is shown. In some embodiments of a display device, parts of the field device can be deactivated as long as the display does not change.

Due to said system architecture of the field device, the energy consumption can be reduced at least in some embodiments by several orders of magnitude because a measurement or display lasts considerably less than one second, but the intervals between the measurements can be hours or even several days.

In one embodiment, the time information is an absolute time, a relative time, a combination and/or a repetition of the absolute or relative time.

If an absolute time is selected as the time information, e.g., a time "10:26 AM," possibly combined with a date, it signifies that the next measurement is scheduled for 10:26 AM. As a result, the measurement result can be transmitted at said time-plus a time period for the processing and transmission of the measurement result. In one embodiment, a repetition of the time can also be determined, e.g., "every day at 10:26 AM."

If a relative time is selected as the time information, e.g., an interval of "40 minutes," it signifies that the next measurement is scheduled at an interval of 40 minutes from the beginning (or, according to another definition, from the end) of the current measurement. As a result, the measurement result can be transmitted after said interval-plus a time period for the processing and transmission of the measurement result, if applicable. In one embodiment, a repetition of the relative time can also be determined, e.g., "every 40 minutes."

In one embodiment, a combination and/or repetition of the absolute or relative time can be determined. Examples are: "every day from 10:20 AM to 11:40 AM every 4 minutes" or "11:07:22 for a period of 91.8 seconds."

As a result of the time information, it is possible that a receiving device is activated from a predefined interval prior to the time of the measurement until a predefined interval after the time of the measurement. In one embodiment, the predefined interval prior to the time of the measurement can be zero.

In one embodiment, the time information, in particular the absolute time or the relative time, is used for the temporal synchronisation of the field device. It is possible, for example, that the local time of the field device deviates from a global time, which is determined, for example, by an atomic clock or by a server. This can be the case, for example, when a quartz clock is used as a clock for the local time, which, for example, is subject to temperature fluctuations, which can lead to a change in the resonance frequency of the quartz crystal. In such case, for example, the local time of the field device can be overwritten by an absolute time (e.g., by the global time from the server). For the synchronisation, a relative time, by means of which the local time of the field device is corrected, can also be transmitted to the field device. This can be effected, for example, in order to take into account the transit times of the signals between the field device and the server (e.g., the roundup delay).

In one embodiment, the field device further comprises a console, which is either connected via a further line to the energy storage means or has its own energy storage means. The console can be a device that can be plugged into the field device and that is connected to the field device, for example, by a service technician for maintenance. The console may have a wireless connection, e.g., a BLUETOOTH® and/or a near-field communication (NFC) interface. The console can be inductively connected to the field device. The console can contain a power supply suitable for charging a battery of the field device.

In one embodiment, the time management unit is designed to transmit the time information to the console and/or to receive said time information from the console. This can take place, for example, during on-site maintenance. In one embodiment, this can be used to synchronise the local time with another time, e.g., with the time of another field device or the time of an atomic clock.

In one embodiment, the field device further has a measuring front end and/or a display front end which is connected to the energy storage means via a switch.

The field device can thus have at least two types of front ends, which are not operated continuously but only, when they are connected via the switch to the energy storage means, i.e., when they are activated. In this case, the measuring front end is designed to measure a measured value which includes a fill level, a flow, or a pressure. The display front end is designed to display the measured value. In the case of a display device, parts of the field device can be deactivated, when no display is shown. In some embodiments of a display device, parts of the field device can be deactivated as long as the display does not change. Examples of such embodiments include display devices that use so-called electronic paper (e-paper).

In one embodiment, the measuring front end and the display front end are arranged in the same field device. In one embodiment, the field device only has the measuring front end and no display front end. In one embodiment, the field device only has the display front end and no measuring front end.

In some embodiments, the radio unit is further designed to transmit the time information and/or the measured value to another field device and/or to receive said time information and/or the measured value from the other field device. For example, field devices without a display front end and without a measuring front end can be used to collect and forward measurement results, or also other data, from or to other field devices. These field devices can, for example, have a repeater function or an energy-saving data collection function, and so the collected data can be transmitted to a radio mast and, in particular, further processed in a central server.

In some embodiments, which contain the display front end and the radio unit, the measurement results can be displayed by a plurality of field devices which contain the measuring front end and the radio unit.

In one embodiment, the radio unit and/or the console is further designed to transmit the time information and/or the measured value to a server and/or to receive said time information and/or the measured value from the server.

This can be particularly used to synchronise a field device with another field device and/or a central server. For example, some field devices can have inaccurate clocks, e.g., because the field devices are exposed to temperature fluctuations. As a result, the time information on the field device can have a different meaning than on another field device and/or on the central server. In an exemplary configuration, it is possible that a first field device, which contains a measuring front end, can show a significantly different first local time than a second local time of a second field device which contains a display front end. The local time is in this case the time in the time management unit of the respective field device. Given a clear difference between first and second local time, it is possible that the first field device will transmit the measurement results at a time when the second field device is deactivated. If the second field device is provided as the sole receiver of the measurement results, these measurement results are lost in such an exemplary configuration. If the second field device (or a server) sends its own local time to the first field device, this can be used for a synchronisation of the local times.

It is also possible to use field devices which, for example, have a repeater function or an energy-saving data collection function in order to transmit the collected data to and process them further in a central server. The server can be wirelessly connected to the field device via the radio unit, or connected wirelessly or by wire to the field device via the console.

In one embodiment, the field device further comprises a processing and control unit which is designed to receive and process the measured value from the measuring front end and/or to process and transmit the measured value to the display front end. The processing and control unit allows, for example, a preprocessing and/or encryption of the measured data and contributes to the use of the field device in a more flexible manner and/or for a wider range of applications.

In one embodiment, the radio unit is a transmitter and/or receiver of a low-energy wide area network. These networks are also referred to as Low Power Wide Area Network (LPWAN).

In one embodiment, the time management unit is designed to control the switch by means of the time information. In such case, the switch is designed as a controllable switch and can be activated and deactivated on the basis of the time information.

The invention also comprises a method of operating a battery-operated field device as described above. The method comprises the following steps:
providing a time information by means of a time management unit;
activating a radio unit by means of a switch; and
transmitting the time information to the radio unit and transmitting the time information by means of the radio unit.

In one embodiment, the field device further comprises the following steps:
activating a radio unit by means of a switch; and
receiving a time information by means of the radio unit and transmitting the time information to a time management unit.

In one embodiment, the field device further comprises the following steps:
providing a console; and
transmitting or receiving a time information to or from the console.

The invention further comprises a program element which, when executed on a time management unit and/or on a processing and control unit, is suitable for executing one of the above-mentioned methods.

The invention further comprises a computer-readable medium, in which said program element is stored.

The invention further comprises the use of a battery-operated field device as described above for measuring and/or displaying the fill level, pressure, or flow of liquids or bulk material.

BRIEF DESCRIPTION OF THE DRAWINGS

For further clarification, the invention shall be described using the embodiments shown in the drawings. These embodiments are to be understood as examples only, but not as a limitation.

DETAILED DESCRIPTION OF EMBODIMENTS

Figure 1:
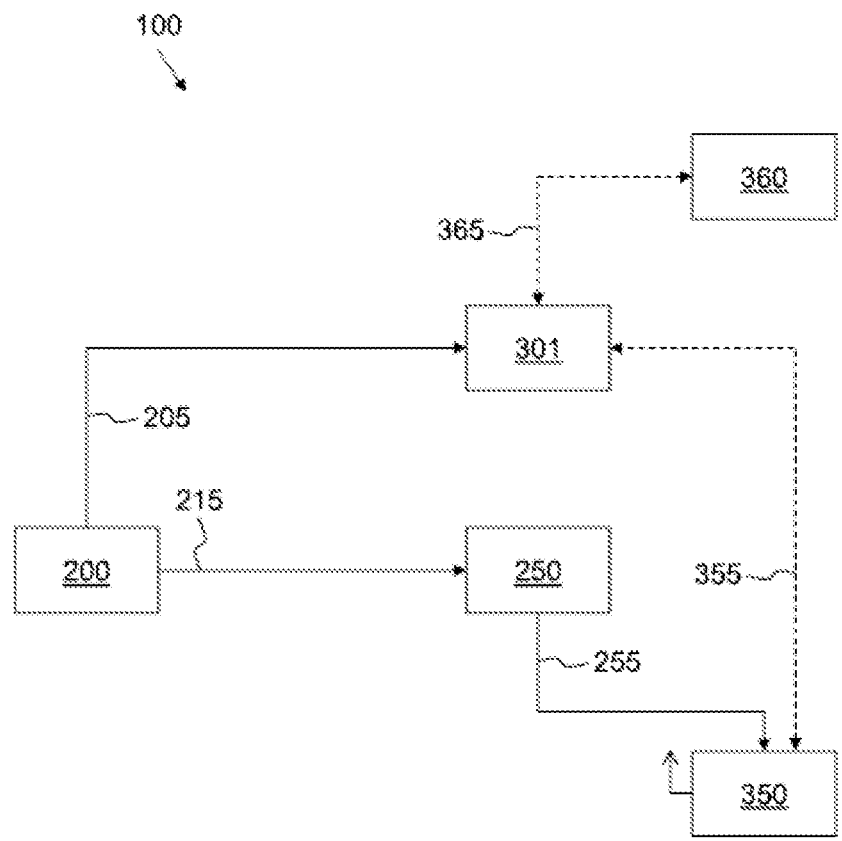
FIG. 1 schematically shows an embodiment of a battery-operated field device.

The embodiment of the field device 100 of FIG. 1 has an energy storage means 200. It can be designed as a battery, as an accumulator (chargeable battery), as a fuel cell, or as a similar device. The energy storage means 200 is connected to a time management unit 301 via a first line 205. The time management unit 301 is thus continuously supplied with power by the energy storage means 200, at least as long as the energy storage means 200 is functional, i.e., has, for example, more than one specific voltage. The time management unit 301 contains a clock with a local time. The time management unit 301 controls some settings or methods that are used to obtain or transmit time information and/or to control by means of the time information.

Furthermore, the field device 100 comprises a radio unit 350, which is connected to the energy storage means 200 via a switch 250, which is arranged between the lines 215 and 255. In this case, the line 255—and devices connected to the switch 250 via the line 255—are activated and deactivated by means of the switch 250. The radio unit 350 is suitable for transmitting and receiving information. The radio unit 350 can only be operated, when the switch 250 is activated, thus connecting the radio unit 350 to the energy storage means 200. The radio unit 350 is designed to transmit time information about the next measurement via a first interface 355 to the time management unit 301 and/or to receive said time information from the time management unit 301, when the switch 250 is activated. The time information can be an absolute time, a relative time, and/or a combination or repetition of the absolute or relative time.

The radio unit is further designed to receive a global time and to transmit said global time via a first interface 355 to the time management unit 301. For that purpose, the time management unit 301 is designed to overwrite the local time with the global time, or correct said local time in another way, and thus synchronise the local time with the global time.

In a further embodiment, the time management unit 301 is designed such that the local time can be transmitted to the radio unit 350 via an interface 355, so as to function as global time for other devices.

Figure 2:
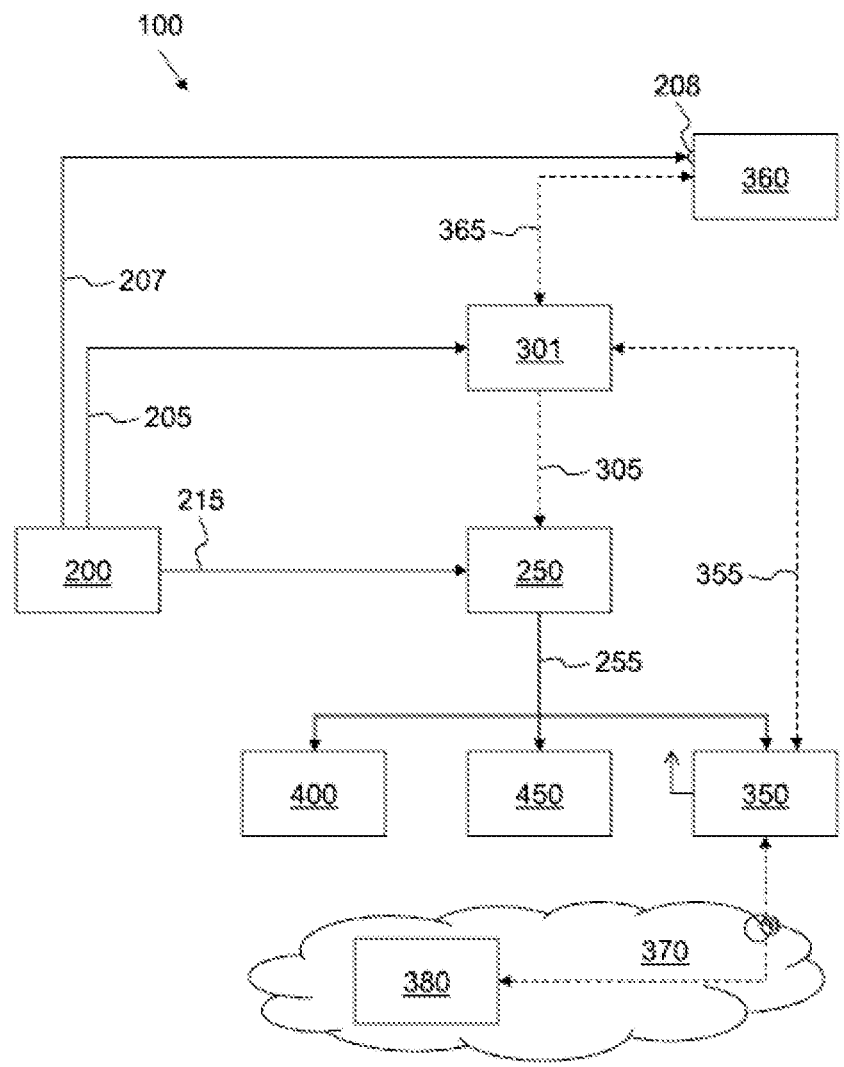
FIG. 2 schematically shows a further embodiment of a battery-operated field device.

FIG. 2 shows a further embodiment of a battery-operated field device 100. Similar to FIG. 1, it shows an energy storage means 200, a time management unit 301, and a radio unit 350 which is connected to the energy storage means 200 via a switch 250. Furthermore, a processing unit 450 and a consumer 400 are connected via line 255 to the switch 250. A consumer 400 can be, for example, a measuring front end 410 and/or a display front end 420 and/or another device.

Due to this system architecture and similarly due to the system architecture of FIG. 1, it is no longer necessary that the entire field device 100 is activated continuously; instead, parts of the field device 100—in the embodiment of FIG. 2: the radio unit 350, the processing unit 450, and a consumer 400—can be deactivated, when no measurement is taking place. In case of a display device, parts of the field device 100 can be deactivated when no display is being shown. Since the radio unit 350, processing unit 450, and consumer 400 elements consume most of the power of the field device 100, the power consumption in the depicted embodiment can be reduced by several orders of magnitude because a measurement or display lasts significantly less than one second, but the intervals between measurements can be hours or even several days.

As a further component, the embodiment of FIG. 2 has a console 360 which is connected to the energy storage means 200 via the line 207 and a connection 208. The connection 208 can be implemented as a plug and, in one embodiment, can also be used to connect the interface 365. The console 360 can have its own energy storage means (not shown in FIG. 2) which can be designed such that it can charge the energy storage means 200 of the field device 100, provided that the energy storage means 200 is designed to be chargeable. The console 360 can also exchange information, e.g., time information or measured values, with the time management unit 301 via the interface 365.

The radio unit 350 can further communicate with a server 380 which is located in a cloud 370. In this case, for example, time information or measured values can be exchanged.

Figure 3:
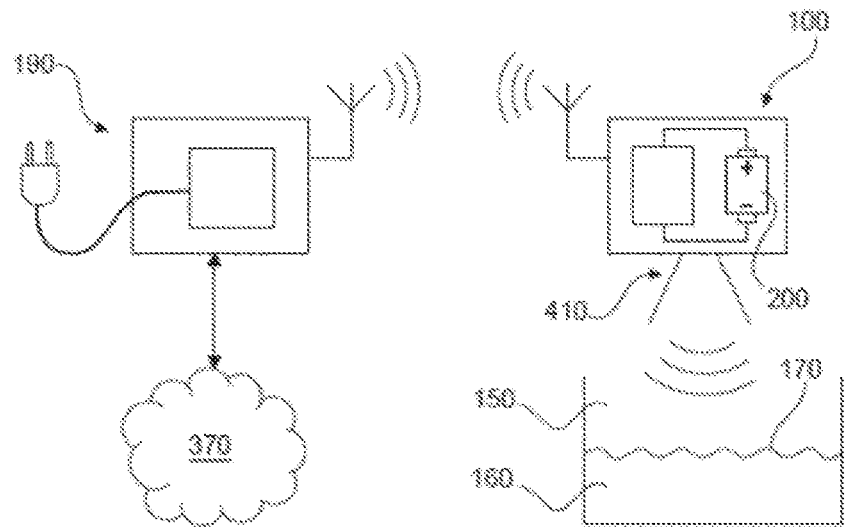
FIG. 3 schematically shows a first exemplary configuration of a battery-operated field device.

FIG. 3 schematically shows a first exemplary configuration of a battery-operated field device 100 (right side) having an energy storage means 200. In this case, the field device 100 measures a fill level 170 of a filling material 160 in a container 150 by means of the measuring front end 410. The field device 100 is wirelessly connected to a line-operated device 190 (left side), e.g., a base station. The device 190 is connected to a cloud 370. The device 190 can receive the signal of an LPWAN device, such as that of the depicted field device 100 and, for example, transmit the measured values to the cloud 370.

Figure 4:
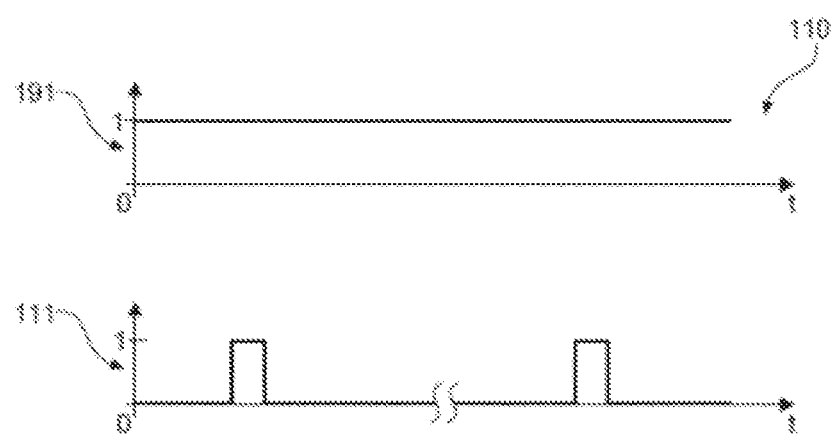
FIG. 4 shows a first time diagram of the operation of a battery-operated field device.

FIG. 4 shows a first time diagram 110 of the operation of a battery-operated field device 100 (sub-diagram 111) in combination with a line-operated device 190 (sub-diagram 191). This corresponds to a scenario as shown, for example, in the exemplary configuration of FIG. 3. Sub-diagram 191 clearly shows that the line-operated device 190 is always ready to transmit and receive, while in sub-diagram 111, the field device 100 is ready to transmit and receive, for reasons of energy efficiency, only for short periods of time.

Figure 5:
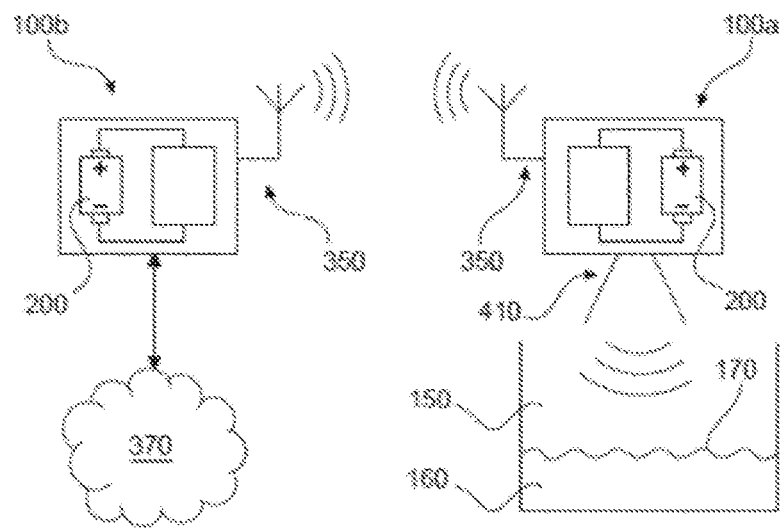
FIG. 5 schematically shows a second exemplary configuration of a battery-operated field device.

FIG. 5 schematically shows a second exemplary configuration of a battery-operated field device 100a (right side) having an energy storage means 200 and a measuring front end 410. The field device 100a communicates with another field device 100b (left side), which can be designed as a repeater. This can be used, for example, in areas where no power grid is available. The battery-operated field device 100b is designed to receive, and possibly collect, measurement data from the measuring front end 410 of the field device 100a and transmit them to a cloud 370, e.g., via a radio mast.

Figure 6:
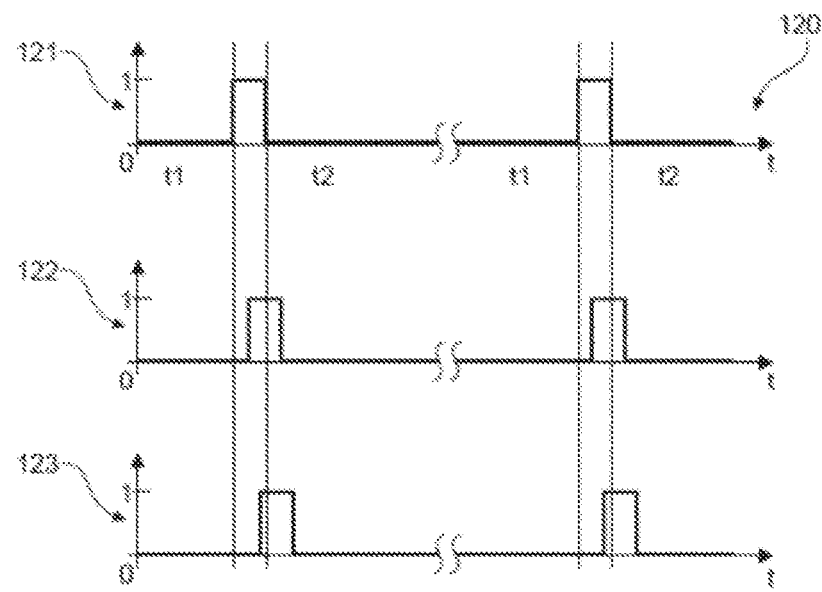
FIG. 6 shows a second time diagram of the operation of a battery-operated field device.

FIG. 6 shows a second time diagram 120 of the operation of a battery-operated field device 100a with a further battery-operated field device 100b, as shown, for example, in the exemplary configuration of FIG. 5. Sub-diagram 121 once again shows the transmission times of the field device 100a; in this case, the field device 100 transmits between time t1 and time t2. For example, the further battery-operated field device 100b can have the sub-diagram 122 or 123. In case of sub-diagram 122, it is still possible to transmit the measurement data—e.g., with appropriate backup with redundant information—with a certain probability or with sufficient quality; however, this is no longer possible in case of sub-diagram 123. This can be due to differing local times in the different field devices 100a and 100b. This effect can be counteracted with a synchronisation of the local times as described above.

Figure 7:
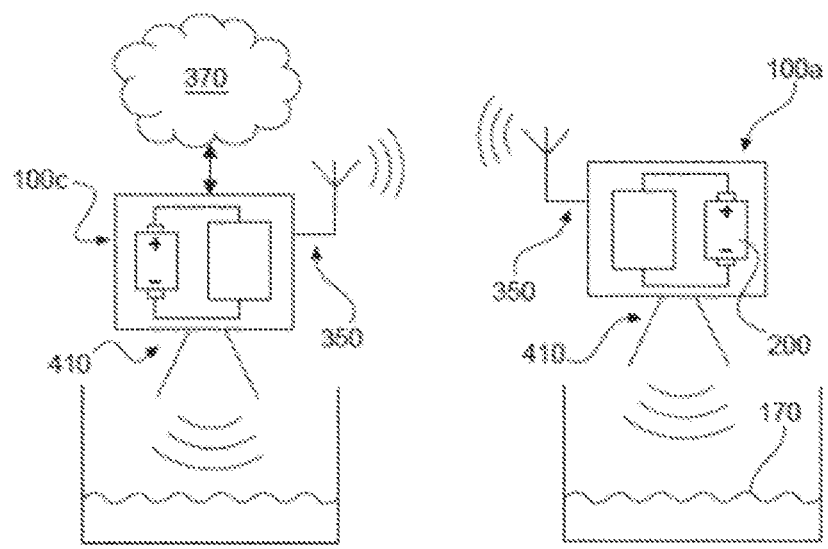
FIG. 7 schematically shows a third exemplary configuration of a battery-operated field device.

FIG. 7 schematically shows a third exemplary configuration of a battery-operated field device 100. In this case, the field device 100a of FIGS. 7, 8, and 9, each shown on the right, corresponds to the field device 100a of FIGS. 3 and 5, also shown on the right. The field device 100c shown on the left has a measuring front end 410 and at the same time a radio unit 350, by means of which it can communicate, for example, with a cloud 370.

Figure 8:
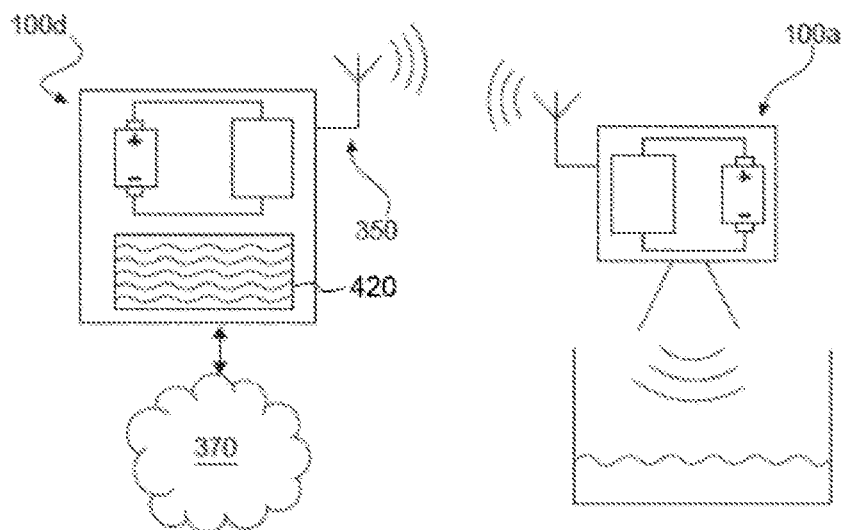
FIG. 8 schematically shows a fourth exemplary configuration of a battery-operated field device.

FIG. 8 schematically shows a fourth exemplary configuration of a battery-operated field device 100. The field device 100d shown on the left has a display front end 420 and at the same time a radio unit 350, by means of which it can communicate, for example, with a cloud 370.

Figure 9:
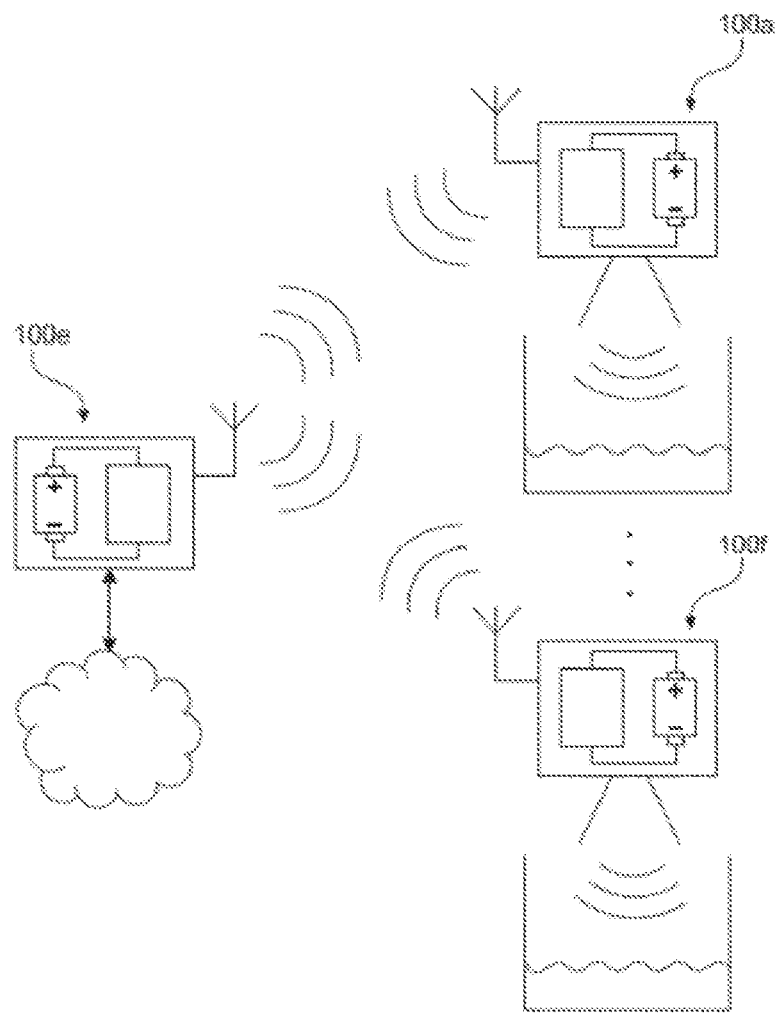
FIG. 9 schematically shows a fifth exemplary configuration of a battery-operated field device.

FIG. 9 schematically shows a fifth exemplary configuration of a battery-operated field device 100. It is shown that a plurality of field devices 100e, 100f with sensors can communicate with a field device 100a. A chain circuit of the field devices is also conceivable.

Figure 10:
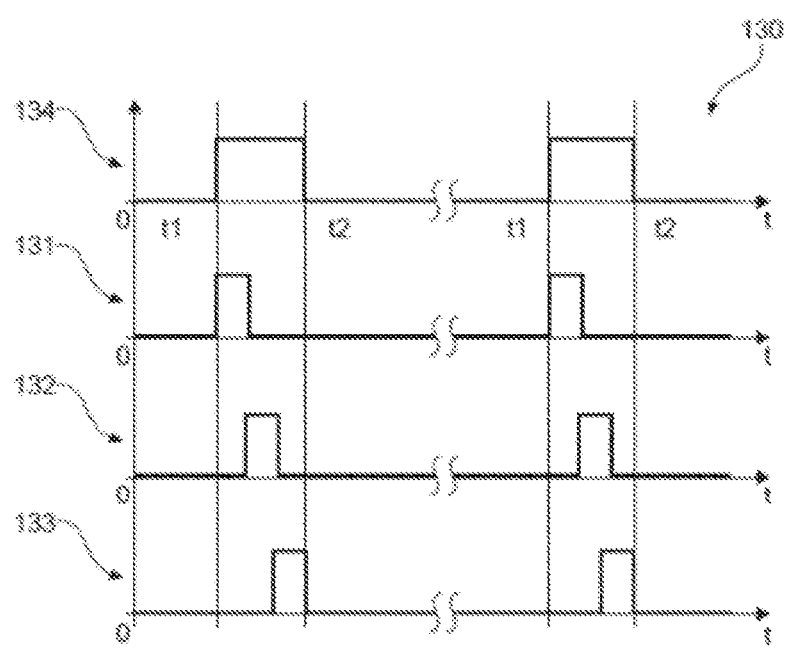
FIG. 10 shows a third time diagram of the operation of a battery-operated field device.

FIG. 10 shows a third time diagram 130 of the operation of a battery-operated field device 100. In order to ensure that a plurality of field devices, with sub-diagrams 131, 132, 133, can communicate with a central field device 100, its sub-diagram 134 must be designed such that its operating time—shown between times t1 and t2—overlaps with the operating times of the other field devices (sub-diagrams 131, 132, 133) and one clearly defined time range is assigned to each of the sub-diagrams of the other field devices.

Figure 11:
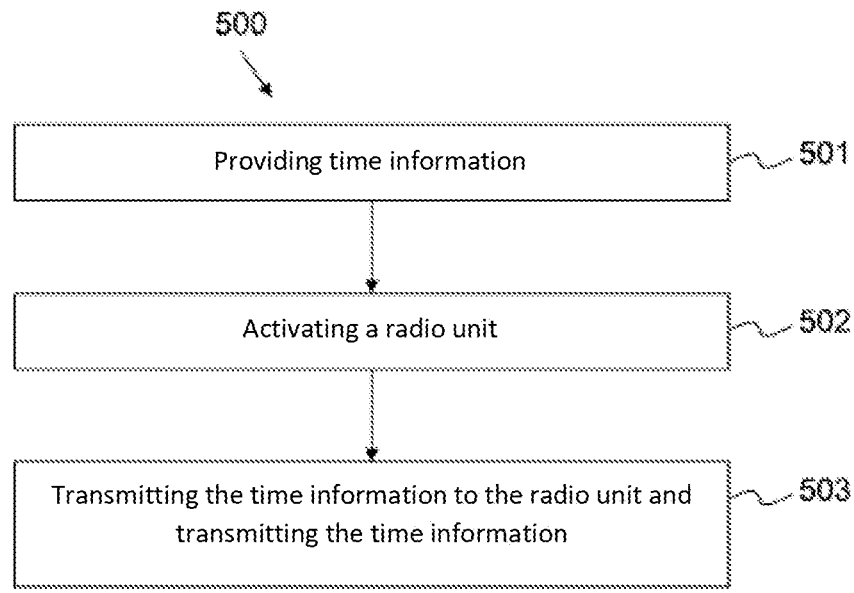
FIG. 11 shows a first method for operating a battery-operated field device.

FIG. 11 shows a first method 500 for operating a battery-operated field device 100. In step 501, time information is provided by means of a time management unit 301. This includes, for example, the reading of a local time from a clock of the field device 100 and a conversion into a format which was agreed upon with other devices. Alternatively or additionally, this can also comprise the reading of a control time, e.g., from a processing unit 450.

In step 502, a radio unit 350 is activated by means of a switch 250. This can be effected directly by actuating the switch 250, or—in case of a controllable switch 250—by means of a console or by the radio unit 350.

In step 503, the time information is transmitted to the radio unit 350. The time information is subsequently transmitted by means of the radio unit 350. The time information can be used to synchronise the local time. In one embodiment, the time information can be used to control another field device 100.

Figure 12:
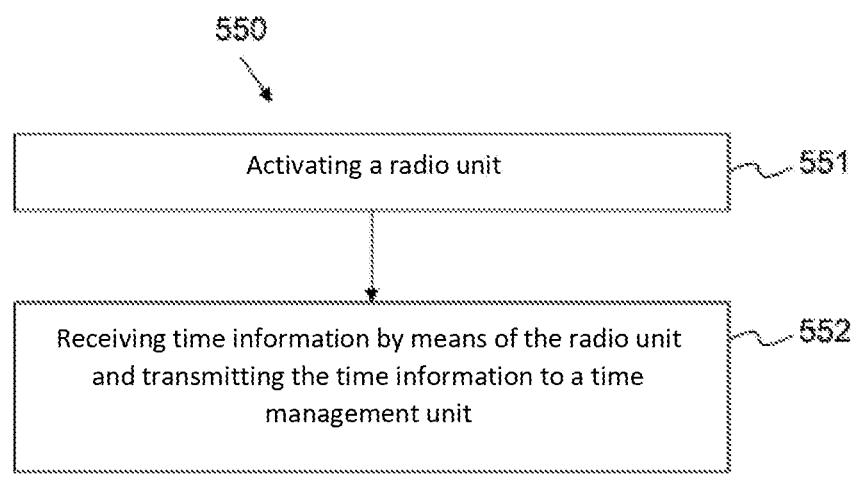
FIG. 12 shows a second method for operating a battery-operated field device.

FIG. 12 shows a second method 550 for operating a battery-operated field device 100. In step 551, a radio unit 350 is activated by means of a switch 250. This can be effected directly by actuating the switch 250, or—in case of a controllable switch 250—by means of a console or by the radio unit 350.

In step 502, a time information is transmitted to a time management unit 301 by means of the radio unit 350 and the time information. The time information can be used to synchronise the local time. In one embodiment, the time information can be used to control said field device 100.

In addition, it must be noted that "comprising" and "having" do not exclude other elements or steps, and the indefinite articles "a" and "an" do not exclude a plural form. It must further be noted that features or steps described with reference to any of the above embodiments can also be used in combination with other features or steps of other embodiments described above. Reference signs in the claims are not to be considered as limitations.

LIST OF REFERENCE SIGNS 100, 100a . . . 100f Battery-operated field device
110, 120, 130 Time diagram
111, 121 . . . 123, 131 . . . 134, 191 Sub-diagrams
150 Container
160 Filling material
170 Fill level
190 Line-operated device
200 Energy storage means
205, 215 First line, second line
207, 255 Line
208 Connection
250 Switch
301 Time management unit
305 Control line
350 Radio unit
355, 365 First interface, second interface
360 Console
370 Cloud
380 Server
400 Consumer
410 Sensor, measuring front end
420 Display front end
450 Processing unit
500, 550 Method
501 . . . 503, 551 . . . 552 Steps

The invention claimed is:
1. A battery-operated field device, comprising:
an energy storage means;
circuitry, which is connected to the energy storage means via a first line and is configured to hold both a local time information and a measurement control time information about a next measurement; and
a radio unit, which is connected to the energy storage means via a switch,
wherein the switch is configured to activate and deactivate at least the radio unit,
wherein the radio unit is configured to transmit said measurement control time information to the circuitry via a first interface and to receive said measurement control time information from the circuitry, when the switch is activated, and wherein the circuitry is configured to control the switch by means of the measurement control time information when the radio unit is deactivated and the measurement control time information is equal to the local time information.

2. The battery-operated field device according to claim 1, wherein the measurement control time information is an absolute time, a relative time, a combination and/or a repetition of the absolute time or the relative time.

3. The battery-operated field device according to claim 2, wherein the measurement control time information is used for a temporal synchronisation of the battery-operated field device.

4. The battery-operated field device according to claim 1, further comprising:

a console, which is either connected via a further line to the energy storage means or has another energy storage means, wherein the circuitry is configured to transmit the measurement control time information to the console and/or to receive said measurement control time information from the console.

5. The battery-operated field device according to claim 4, further comprising:

a measuring front end and/or a display front end, which is connected to the energy storage means via the switch;

wherein the measuring front end is configured to measure a measured value comprising a fill level, a flow, or a pressure; and the display front end is configured to display the measured value.

6. The battery-operated field device according to claim 5, wherein the radio unit is further configured to transmit the measurement control time information and/or the measured value to another field device and/or to receive the measurement control time information and/or the measured value from said another field device.

7. The battery-operated field device according to claim 5, wherein the radio unit and/or the console is further configured to transmit the measurement control time information and/or the measured value to a server and/or to receive the measurement control time information and/or the measured value from the server.

8. The battery-operated field device according to claim 5, further comprising:

a processing and control unit, which is configured to receive and process the measured value from the measuring front end and/or to process and transmit the measured value to the display front end.

9. The battery-operated field device according to claim 1, wherein the radio unit is a transmitter and/or receiver of a low-energy wide area network.

10. A method for operating a battery-operated field device according to claim 1, the method comprising:

activating the radio unit by means of the switch;

receiving the measurement control time information by means of the radio unit and transmitting the measurement control time information to the circuitry, wherein the circuitry is configured to control the switch by means of the measurement control time information;

deactivating the radio unit by means of the switch; and activating the radio unit by means of the switch on the basis of the measurement control time information.

11. The method for operating a battery-operated field device according to claim 10, the method further comprising:

providing a console; and transmitting or receiving the measurement control time information to or from the console.

12. A nontransitory computer-readable storage medium having a program stored therein, which, when executed in the circuitry and/or in a processing and control unit, instructs the circuitry and/or the processing and control unit to perform the method according to claim 10.

\* \* \* \* \*